(12) United States Patent
Belharouak et al.

(10) Patent No.: US 7,632,317 B2
(45) Date of Patent: Dec. 15, 2009

(54) METHOD FOR MAKING A BATTERY

(75) Inventors: Ilias Belharouak, Westmont, IL (US); Khalil Amine, Downers Grove, IL (US)

(73) Assignee: Quallion LLC, Sylmar, CA (US)

( * ) Notice: Subject to any disclaimer, the term of this patent is extended or adjusted under 35 U.S.C. 154(b) by 1236 days.

(21) Appl. No.: 10/612,439

(22) Filed: Jul. 1, 2003

(65) Prior Publication Data

US 2004/0157126 A1 Aug. 12, 2004

Related U.S. Application Data

(60) Provisional application No. 60/423,953, filed on Nov. 4, 2002, provisional application No. 60/463,696, filed on Apr. 16, 2003.

(51) Int. Cl.
*H01M 10/38* (2006.01)
*H01M 4/58* (2006.01)

(52) U.S. Cl. .............. 29/623.5; 29/623.1; 429/231.8; 429/52

(58) Field of Classification Search .............. None
See application file for complete search history.

(56) References Cited

U.S. PATENT DOCUMENTS

| 5,910,382 | A * | 6/1999 | Goodenough et al. .... 429/218.1 |
| 6,514,640 | B1 | 2/2003 | Armand et al. |
| 6,589,696 | B2 | 7/2003 | Matsubara et al. |
| 2002/0192137 | A1 | 12/2002 | Chaloner-Gill et al. |
| 2003/0138697 | A1 | 7/2003 | Leising et al. ........... 429/231.1 |
| 2003/0138698 | A1 | 7/2003 | Lee et al. |
| 2004/0033360 | A1 * | 2/2004 | Armand et al. ............. 428/408 |
| 2004/0072075 | A1 | 4/2004 | Tsukamoto et al. ...... 429/231.7 |

FOREIGN PATENT DOCUMENTS

| CA | 2200998 | | 9/1998 |
| CA | 2270711 | * | 10/2000 |
| EP | 1 193 787 A2 | | 4/2002 |
| JP | 7335263 A2 | | 12/1995 |
| JP | 2001-110414 A | | 4/2001 |

(Continued)

OTHER PUBLICATIONS

R. Brec et al., Chemical and Electrochemical Study of the $Li_2FeS_2$ Cathodic System, Mater. Res. Bull., 1980, 15,619-625.

(Continued)

*Primary Examiner*—John S Maples
(74) *Attorney, Agent, or Firm*—Gavrilovich, Dodd & Lindsey, LLP (57) ABSTRACT

A method for coating an active material with carbon to form an electrode material is disclosed, comprising: exposing olivine or nasicon to a carbon source gas in a furnace; and heating the carbon source gas to deposit carbon thereon. The carbon source gas, which may be mixed with an inert gas, generally decomposes between 100° C. and 1300° C. to generate carbon material. The amount of coated carbon on the olivine or nasicon is preferably <15 wt %, and more preferably about 4 wt % or less. Also disclosed is a battery comprising: a positive electrode comprising the inventive electrode material; a negative electrode; and an electrolyte.

26 Claims, 12 Drawing Sheets

FOREIGN PATENT DOCUMENTS

| | | |
|---|---|---|
| JP | 2001110414 | 4/2001 |
| WO | WO 02/27823 A1 | 4/2002 |
| WO | WO 02/27824 A1 | 4/2002 |
| WO | WO 02/046101 A3 | 6/2002 |
| WO | WO 02/073716 A2 | 9/2002 |

OTHER PUBLICATIONS

V.B. Nalbandyan, et al., New Modification of Lithium Monoferrite and the Morphotropic Series $AFeO_2$, Russian Journal of Inorganic Chemistry, 1987, 32, 3, 453-454.

A. Manthiram et al., Lithium Insertion into $Fe_2(MO_4)_3$ Frameworks: Comparison of M=W with M=Mo, Journal of Solid State Chemistry, 1987, 71, 349-360.

R.W. Pekela, Organic Aerogels From The Polycondensation Of Resorcinol With Formaldehyde, Journal of Materials Science, 1989, 24, 3221-3227.

A.K. Padhi et al., Phospho-olivines as Positive-Electrode Materials for Rechargeable Lithium Batteries, J. Electrochem. Soc., 1997, 144, 4, 1188-1194.

A.K. Padhi et al., Effect of Structure on the $Fe^{3+}/Fe^{2+}$ Redox Couple in Iron Phosphates, J. Electrochem. Soc., 1997, 144; 5, 1609-1613.

H. Huang et al., Approaching Theoretical Capacity of $LiFePO_4$ at Room Temperature at High Rates, Electrochemical and Solid-State Letters, 2001, 4(10), A170-A172.

S. Yang et al., Reactivity, Stability and Electrochemical Behavior of Lithium Iron Phosphates, Electrochemistry Communications, 2002, 4(3), 239-244.

P.P. Prosini et al.. Determination of the Chemical Diffusion Coefficient of Lithium in $LiFePO_4$, Solid State Ionics, 2002, 148, 45-51.

F. Croce et al., A Novel Concept for the Synthesis of an Improved $LiFePO_4$ Lithium Battery Cathode, Electrochemical and Solid State Letters, 2002, 5(3), A57-A50.

I. Belharouak et al., Improved $LiFePO_4$ Cathode for Lithium-Ion Batteries, Presented at the 14th International Conference on Solid State Ionic's, Extended Abstract, Jun. 22-27, 2003, Monterey, California, USA, 2 pages.

F. Croce et al., Composite $Ag-LiFePO_4$ Cathode for Polymeric Lithium Batteries, The Electrochemical Society; http://www electrochem.org/meetings/future/203/meetng.htm, 1 page (no date).

A. D'Eplfanio at al., Quartz iron Phosphate As New Lithium Intercalation Electrode, The Electrochemical Society; http://www. electrochem.org/meetings/future/203/meetng.htm, 1 page (no date).

\* cited by examiner

METHOD FOR MAKING A BATTERY

REFERENCE TO PRIOR FILED APPLICATIONS

This application claims priority to copending provisional application Ser. No. 60/423,953, filed Nov. 4, 2002, and to copending provisional application Ser. No. 60/463,696, filed Apr. 16, 2003, the disclosure of each of which is incorporated herein in its entirety by reference, including all disclosures submitted therewith.

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory.

TECHNICAL FIELD

This invention relates to improved active materials for lithium ion batteries.

BACKGROUND

Lithium iron oxide compounds have been extensively investigated during the last decade as alternative positive electrode materials to $LiCoO_2$ and $LiNiO_2$ having reduced cost and improved safety for lithium ion batteries.[1-3] For example, $LiFeO_2$ has been prepared by ion exchange from $\alpha$-$NaFeO_2$, but it is metastable and leads to poor battery performance[4]. $\alpha$-FeOOH (Akaganeite) is an iron oxy-hydroxide that has also been studied [5]. Although it has an attractive open structure with large tunnels, the lithiation process occurs at low voltage with poor rechargeability performance. From these two examples, several authors have related these results to an antagonist change of the bond structure of $Fe^{4+}/Fe^{3+}$ and $Fe^{3+}/Fe^{2+}$ redox couples within the $O_{2-}$ based oxide materials. Indeed, $Fe^{4+}/Fe^{3+}$ redox energy tends to lie too far below the Fermi level of a lithium anode. On the contrary, $Fe^{3+}/Fe^{2+}$ tends to lie too close to it, which lowers the voltage to a non-useful limit. To reduce the margin of this antagonist effect, Goodenough et al. introduced phosphorus within the iron oxide family in order to reduce the covalency of the Fe—O bond, which faces a strongly covalent P—O bond. Therefore, they investigated several phosphate materials like nasicon $Li_3Fe_2(PO_4)_3$ and olivine $LiFePO_4$[2-3]. Since then, iron based phosphate materials are gaining much attention as positive active materials for consumer batteries.

Lithium extraction from $LiFe^{II}PO_4$ (olivine) gives rise to $Fe^{III}PO_4$ orthophosphate where the $Fe^{2+}/Fe^{3+}$ redox couple occurs at a constant voltage, 3.5V. The theoretical capacity is 170 mAh/g, with 160 mAh/g capacity available experimentally. Discharged and charged positive active materials, $LiFePO_4$ and $FePO_4$, respectively, have the same structural arrangement, i.e. same space group and close crystalline parameters, leading to a very good stability of the system during the electrochemical cycling process. This stability is not altered by $Fe^{3+}$ ion generation, which is not the case when highly oxidizing $Ni^{4+}$ ions are involved during the charge of $LiM^{III}O_2$ (M=Ni, Co) layered material. In addition, the cutoff voltage 3.7 V is not so high as to accelerate electrolyte degradation. $LiFePO_4$ is an inexpensive material, nontoxic, and environmentally benign. For these reasons, olivine seems to be an attractive positive active material that could provide stable capacity and excellent calendar life.

Olivines, such as $LiFePO_4$, are insulating materials, which seriously limits rate capability. Therefore, extensive work is in progress targeting the improvement of electronic conductivity by using carbon composite techniques, like carbon gel and sugar processes. So far, to get the desired conductivity, a conductor such as at least 15% of carbon additive has been needed to be mixed with the olivine active material. Unfortunately, the carbon is inactive, not contributing to the battery capacity. The challenge is to improve significantly the electronic conductivity and rate capability of the olivine using a reduced carbon ratio so as to minimize capacity loss and decreased energy density due to the inactive carbon. Like olivines, nasicons are insulating materials, with the same challenge to improve conductivity and rate capability using a reduced carbon ratio to minimize initial capacity loss and decreased energy density.

SUMMARY

A method for coating olivine with carbon is disclosed, comprising the acts of: exposing olivine to a carbon source gas in a furnace; and heating the carbon source gas to deposit carbon on the olivine. Olivine is represented by the formula, $LiFe_{1-x}M_xPO_4$, wherein M is chosen from the group consisting of Mn, Co, Ti, and Ni; and $0 \leq x \leq 1$. The carbon source gas generally decomposes between 100° C. and 1300° C. to generate carbon material and may be chosen from acetylene, butane, 1-3 butadiene, 1-butene, Cis-2-butene, Trans-2-butene, 2-2 dimethylpropane, ethane, ethylene, isobutane, isobutylene, methane, propane, toluene, propylene, and mixtures thereof. The carbon source gas may be mixed with an inert gas, which may be chosen from the group consisting of: nitrogen, helium, argon, and mixtures thereof. The furnace may be a fluidized bed furnace, a rotatory furnace, or a static furnace.

Also disclosed is carbon coated olivine made by the process of: exposing olivine to a carbon source gas in a furnace; and heating the carbon source gas to deposit carbon on the surface of olivine and inside the olivine particles via its pores. The amount of coated carbon is <15 wt %, and preferably about 4 wt % or less.

Also disclosed is a battery, preferably a secondary battery, comprising: a positive electrode comprising the carbon coated olivine material; a negative electrode; and an electrolyte. As examples, the negative electrode may comprise lithium metal, graphite, other carbon, $Cu_6Sn_5$, $Cu_2Sb$, MnSb, other metal alloys, $Li_4Ti_5O_{12}$, silica alloys, and mixtures thereof The electrolyte may be a nonaqueous electrolyte and may comprise a salt dissolved in a solvent comprising at least one linear or cyclic carbonate. As examples, the salt may be $LiPF_6$, $LiBF_4$, Li-methide, Li-imide, $LiClO_4$, $LiAsF_6$, $LiCF_3SO_3$, $Li(CF_3SO_2)_2N$, $Li(CF_3SO_2)_3C$, $LiN(SO_2C_2F_5)_2$, lithium alkyl fluorophosphate, lithium bis(chelato)borates such as lithium bis(oxalato) borate (LiBOB), and mixtures thereof, with LiBOB being preferred where safety is a concern.

The techniques and structures for improving conductivity of olivine that are discussed herein also can be applied to nasicon. Likewise, carbon coated nasicon made by the process described herein can be used in place of carbon coated olivine in the battery disclosed herein. Nasicon is represented by the formula, $A_nB_2(XO_4)_3$, wherein A is chosen from the group consisting of: Li, Ag, Cu, Na, Mn, Fe, Co, Ni, Cu, and Zn; B is chosen from the group consisting of: Ti, V, Cr, Fe, and Zr; X is chosen from the group consisting of: P, S, Si, W, Mo; and n is between 0 and 3.

DETAILED DESCRIPTION

Preparation of $LiFePO_4$/C Composite Material

The present inventors have used a different method for coating olivine particles with carbon when compared to a carbon gel technique that was developed by L. Nazar et al. [6] in Canada for synthesizing composite $LiFePO_4$/carbon material. $LiFe^{+II}PO_4$/C (phosphate/carbon) composite material was prepared by a solid-state reaction consisting of a mixture of iron(II) oxalate, ammonium dihydrogen phosphate, and lithium carbonate, which was added to a mixture of resorcinol-formaldehyde in the appropriate proportions. The precursors were mixed by ball milling in acetone overnight. The obtained gel was first dried at 60° C. under vacuum, and then thoroughly reground, before being heated under purified nitrogen gas flow for 24 h at 700° C. The amount of carbon in the composite was 15% by weight. X-ray diffraction (XRD) confirmed that, even mixed with carbon, the composite has the structure of $LiFePO_4$. The main difference between our adopted method and the Nazar process is that the Nazar process involves first preparing the carbon gel using the process of Pekela et al. [7] and then mixing it with the starting raw materials used to prepare $LiFePO_4$. Note that in the Pekela process, the use of sodium carbonate ($Na_2CO_3$) is necessary during the gel formation, which means that several wash operations are needed to extract water and sodium carbonate from the gel before its utilization. While either our process or that of Nazar may be used to provide the olivine positive active material for lithium ion batteries, our process is preferred because it is easier and provides at least comparable electrochemical performance. Indeed, these processes are hard to scale up because of the numerous steps involved during the preparation of the material and the cost of the organic materials that are used to make the carbon gel, which will surely have an impact on the cost of the final material. To overcome this problem, some laboratories are using sugar as a carbon source but the performance of the resulting material is similar to the carbon composite [8,9,14]. Also, to get good electrochemical performance of the olivine composite used by those laboratories, the olivine should have at least between 12 to 15% of carbon on it, which is about the same ratio used when simply mixing carbon additive using a method well known in the art. Using this traditional simple mixing method, the final material is inhomogeneous in shape and size, regardless of the mixing time, which may be due to the nature of carbon gel that tends to form aggregates of carbon leading to inhomogeneous microdomains. References are available for more information about the most recent technological progress on $LiFePO_4$ positive electrode material [8-15].

Carbon Coating Technology (CCT)

In the present invention, a very simple technique is used that can be scaled up easily. A preheated reactor furnace containing olivine material is fed with a carbon source gas, which may be mixed with an inert gas to improve safety and facilitate controlling the carbon deposition rate. The carbon source gas is any carbon-containing gas that decomposes at a predetermined temperature to generate carbon material. It may comprise propylene, acetylene, butane, 1-3 butadiene, 1-butene, Cis-2-butene, Trans-2-butene, 2-2 dimethylpropane, ethane, ethylene, isobutane, isobutylene, methane, propane, toluene, or the like, or mixtures thereof. The inert gas, if used, may comprise nitrogen, helium, argon, or mixtures thereof. 97% nitrogen and 3% propylene, by weight, at 700° C. is the preferred gas mixture and temperature. The speed of the flow ($N_2:C_3H_6$) and the time of the reaction are estimated depending on the expected olivine/carbon ratio. The cracking process of propylene starts at around 400° C., and synthesis of $LiFePO_4$ occurs at 700° C. Therefore, the temperature for coating olivine may be chosen to be between 400° C. and 700° C. Note that the ratio of $N_2$ to $C_3H_6$ can also vary from the 97:3 used. A mixture of two or more carbon source gases may be used, and each may have a different cracking temperature. Also, this technique may be used to carbon coat other electrode materials besides olivine, and may use a high coating temperature, such as up to 1300° C., due to the materials' ability to withstand higher temperatures. For example, natural graphite could be coated at high temperature. On the other hand, lower temperature carbon coating, as low as 100° C. can be used to deposit coatings made from low temperature cracking materials. Other examples of positive active materials that may be coated to improve conductivity include $LiCoNiAlO_2$, $LiCo_{1/3}Ni_{1/3}Mn_{1/3}O_2$, $LiNi_{1/2}Mn_{1/2}O_2$, $LiNi_{1/2}Co_{1/2}O_2$, and $LiFeMnO_4$.

Using the gas phase coating technique, before the decomposition, propylene gas is in contact not only at the surface of olivine particles, but also penetrates the pores of the particles. The resulting deposition of carbon within the pores creates a conductive pathway inside the particles of the olivine itself, thereby increasing overall conductivity.

Experiment

LiFe$^{+II}$PO$_4$ composite material was prepared by a solid-state reaction comprising a mixture of iron(II) oxalate Fe(C$_2$O$_4$).2H$_2$O, ammonium dihydrogen phosphate NH$_4$H$_2$PO$_4$, and lithium carbonate Li$_2$CO$_3$ in the molar ratio (1:1:1). The precursors were mixed by ball milling in an acetone medium. The obtained gel was first dried at 60° C. under vacuum, and then thoroughly reground.

It was then heated under purified N$_2$ inert gas for 24 h at 700° C. The obtained powder was green-gray, indicating that most of the iron was in its oxidation state (II). The resulting material was then coated with conductive carbon layers at a nanoscale level using the CCT process as explained above.

Figure 1:
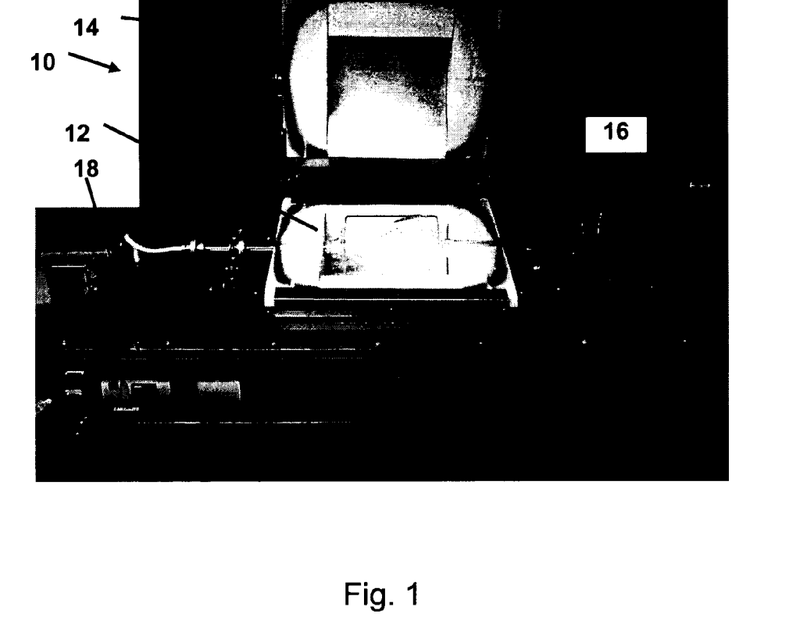
FIG. 1 is a plan view of a rotatory reactor furnace.
Figure 2:
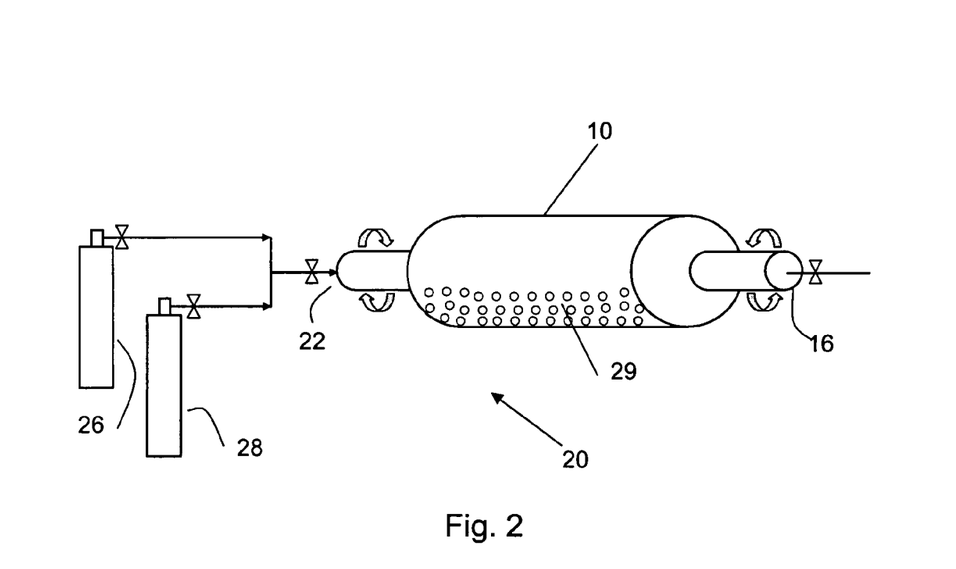
FIG. 2 is a schematic view of equipment used to carbon coat olivine according to the method of the present invention.

FIG. 1 shows a general view of the rotatory reactor furnace 10 comprising a fused quartz vessel 12 within a stainless steel cage 14 having a gas outlet 16 and controlled by a controller unit 18. Alternatively, other furnaces such as a fluidized bed furnace or static furnace may be used. FIG. 2 shows the equipment 20 including the quartz rotatory reactor furnace 10 having an inlet 22 and an outlet 16. The flow was switched from nitrogen from nitrogen tank 26 to N$_2$:C$_3$H$_6$ gas from nitrogen/propylene tank 28 while the furnace 10 was in rotation. Furnace 10 contained the olivine with zirconia balls 29 that were used to help to make the coating as uniform as possible. The coating time and the gas flow were chosen to produce the desired olivine/carbon ratio. For example, if the gas flow were fixed, only the time would be varied to apply a thicker or thinner coating.

We have developed two methods for determining the carbon amount in the olivine coated material. The first method comprises dissolving the material in preheated HCl acid with a vigorous stirring. After filtration, the carbon is separated, dried, and weighed. The resulting solution is analyzed with atomic absorption in order to determine the lithium, iron, and phosphorus concentrations. Then the carbon percentage is determined by difference of weights. The second method is more convenient, faster, and gives similar accuracy compared to the first. In this second method, thermogravimetric analysis (TGA) is carried out under purified airflow on both coated and uncoated olivine material.

Oxidative Mechanism of LiFePO$_4$ and LiFePO$_4$/C

Figure 3:
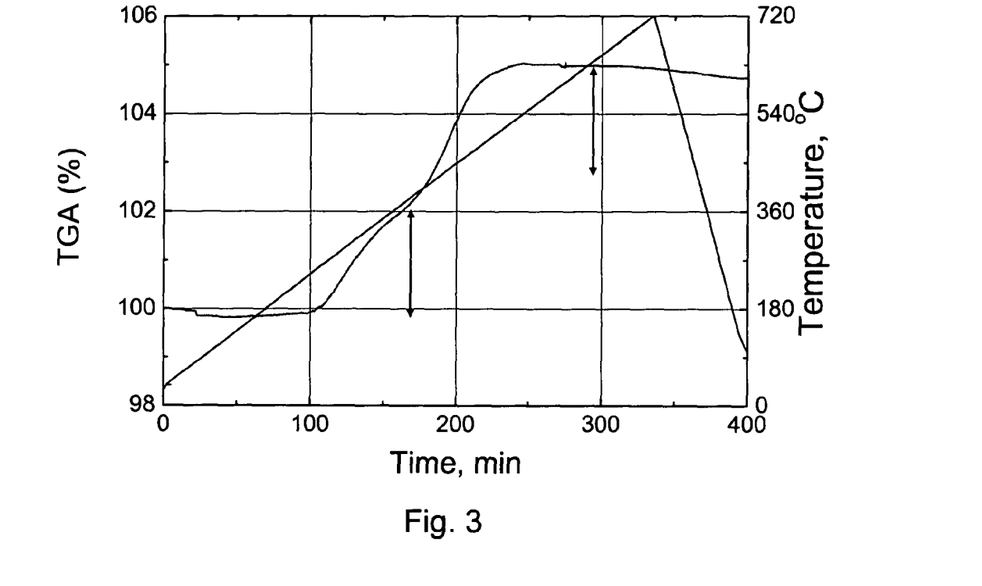
FIG. 3 is a thermogravimetric analysis (TGA) of uncoated olivine.
Figure 4:
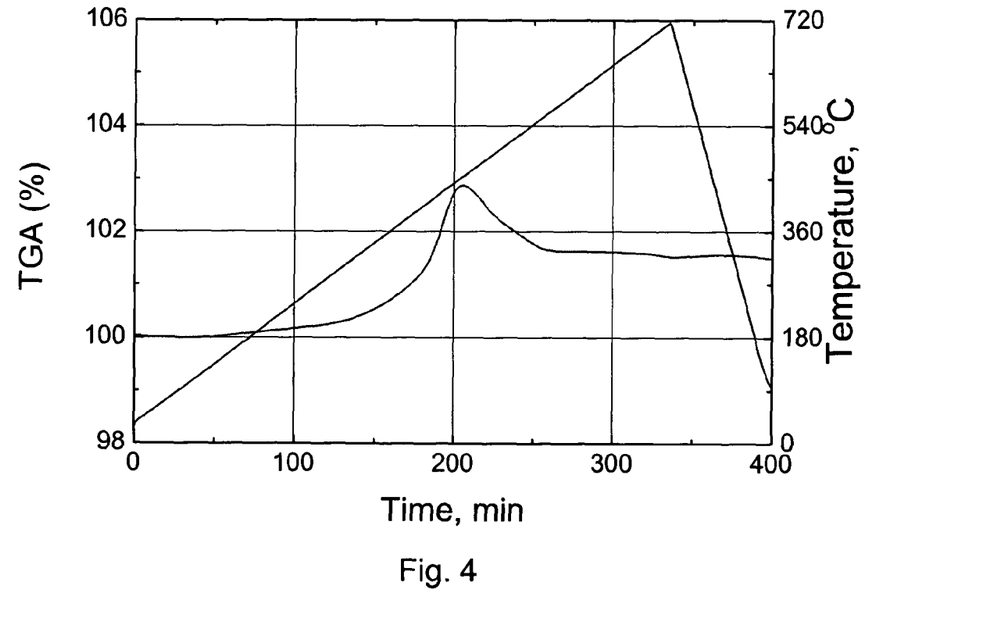
FIG. 4 is a TGA of the carbon coated olivine.

FIGS. 3 and 4 show TGA performed on LiFePO$_4$ and carbon coated LiFePO$_4$, respectively. Although a loss in weight had been expected, the TGA curves showed an unexpected weight gain with time and temperature of 5.03% for the olivine and 1.62% for the carbon coated olivine. Each material was then studied separately in order to come up with mechanisms to explain the thermogravimetric phenomena seen in FIGS. 3 and 4.

Figure 5A:
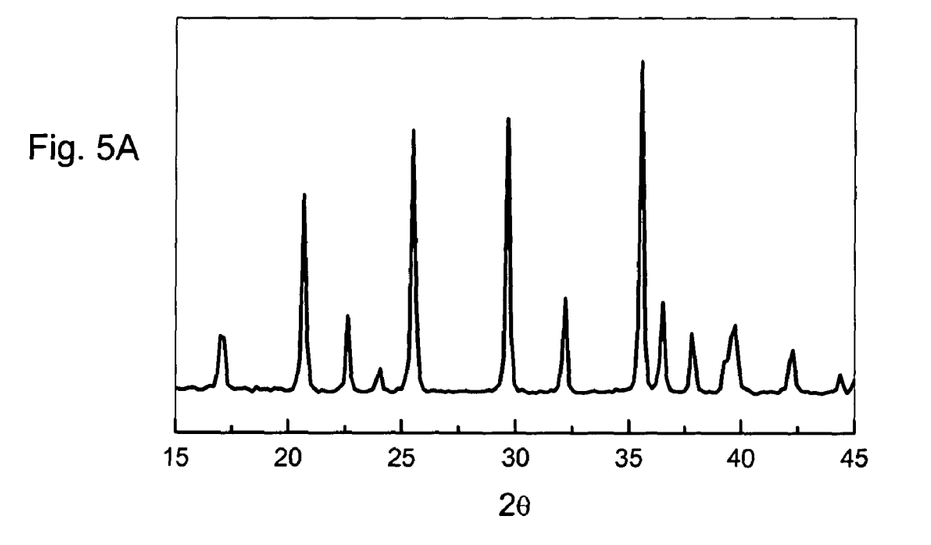
FIG. 5A is an X-ray diffraction pattern of $LiFePO_4$ made at 700° C. under $N_2$ atmosphere.
Figure 5B:
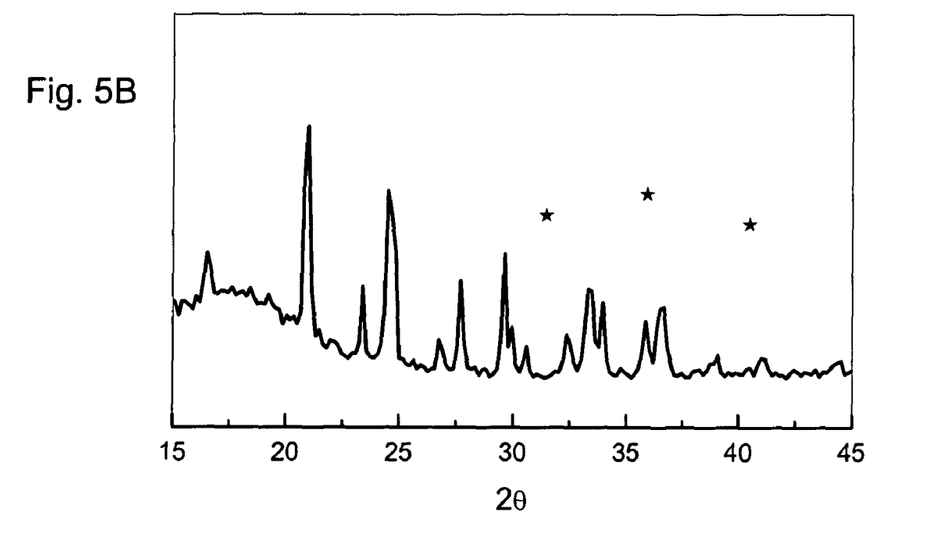
FIG. 5B is an X-ray diffraction pattern of the resulting products after thermogravimetric analysis (TGA) of $LiFePO_4$ performed under dry air.
Figure 6:
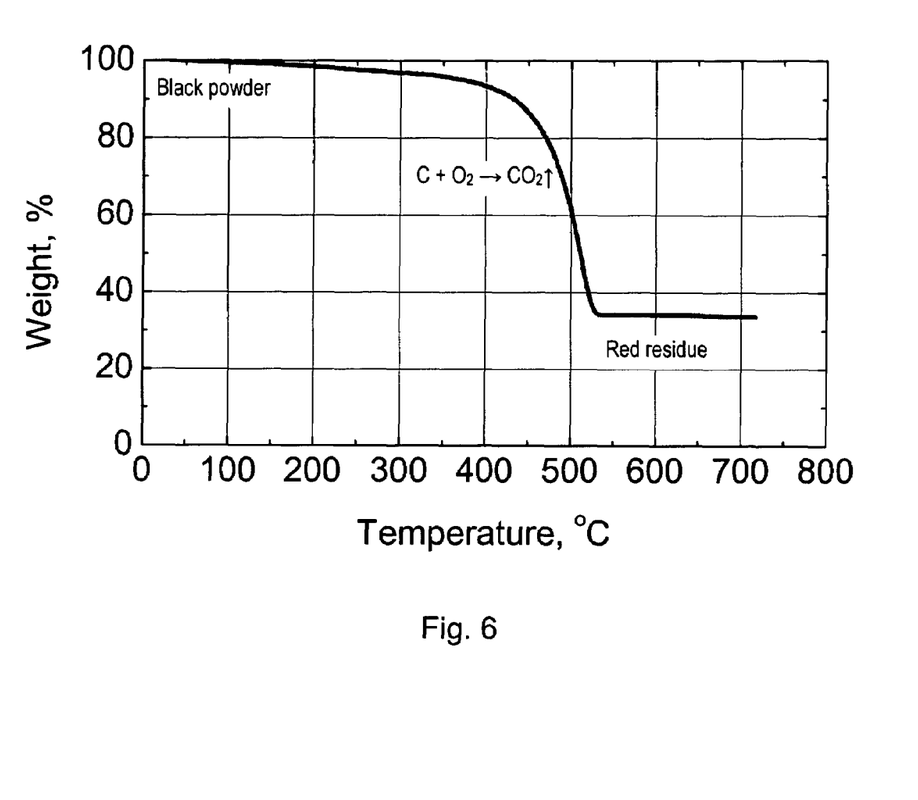
FIG. 6 is a TGA of carbon from the carbon coated olivine.

FIGS. 5A and 5B show an X-ray diffraction (XRD) pattern of LiFePO$_4$ made at 700° C. under N$_2$ atmosphere and an XRD pattern of the resulting products after TGA of LiFePO$_4$ performed under dry air, respectively. X-ray analysis was a good tool because we could detect two phases (Li$_3$Fe$_2$(PO$_4$)$_3$ and Fe$_2$O$_3$) by the end of TGA experiments. Asterisks in FIG. 6B show Fe$_2$O$_3$ peaks, with the remaining lines being characteristic of Li$_3$Fe$_2$(PO$_4$)$_3$ phosphate. Both LiFePO$_4$ and LiFePO$_4$/C are completely oxidized beyond 550° C., which is consistent with the plateaus seen in the thermograms of FIGS. 3 and 4. Therefore, but without intent to be limited by the validity of our theory, by coupling TGA with X-ray analysis, we propose the oxidative mechanisms as follows:

As seen in FIG. 3, LiFePO$_4$ starts to react with oxygen/air at around 230° C., below which it is quite stable. From 230° C. to 530° C., olivine is oxidized by gaining weight in two steps (A and B) and then is very stable from 530° C. to 700° C. Although the mechanisms occurring at step A and B are not yet fully known, an important point is that we are able to detect the formation of two phases (Li$_3$Fe$_2$(PO$_4$)$_3$ and Fe$_2$O$_3$) when LiFePO$_4$ is being completely oxidized. Therefore, the following oxidative mechanism for LiFePO$_4$ is proposed:

|  | Reactants | | Products | |
|---|---|---|---|---|
|  | LiFePO$_4$ | ¼ O$_2$ | ⅓ Li$_3$Fe$_2$(PO$_4$)$_3$ | ⅙ Fe$_2$O$_3$ |
| Molecular Weight (M) | 157.7594 | 31.9988 | 417.4312 | 159.6922 |
| Stoichiometry (N) | 1 | ¼ | ⅓ | ⅙ |
| N × M | 157.7594 | 7.9997 | 139.1437 | 26.6154 |

Theoretically, according to the proposed mechanism, we expect 5.07% increase in weight, which is very close to the 5.03% increase found experimentally (see FIG. 3).

$$5.07\% \text{ (theoretical)} = \frac{(139.1437 + 26.6154) - 157.7594}{157.7594}$$

$$\approx 5.03\% \text{ (experimental)}$$

As one can expect, the TGA study of mixed samples such as carbon coated olivine is not easy because various TG phenomena can interfere with each other at different temperatures within the temperature range used in the TGA. The simultaneous occurrence of thermogravimetric reactions in opposite directions (weight gain and loss occurring at the same time) leading to a resultant further complicates understanding of each phenomenon separately. To overcome this problem and in order to understand better, we separated olivine from the carbon as follows: The carbon coated olivine was dissolved in aqua regia at 80° C., and then the remaining black suspension was filtered and dried at 200° C. The fine black powder is an amorphous material and has a lot of similarities with conventional carbon.

FIG. 6 shows the TG analysis curve of this fine black powdery material run under 02 gas. In the first portion of the curve, carbon reacts with the oxygen to form carbon dioxide gas. Beyond 550° C., to our surprise, 34% of the starting weight of the material that had been believed to be carbon did not oxidize and outgas. The color of this residual material was red. The material was then analyzed by XRD which showed the presence of Li$_3$Fe$_2$(PO$_4$)$_3$ and Fe$_2$O$_3$, already characterized as products of the oxidation of LiFePO$_4$ in air. Since aqua regia is a very aggressive acid, especially at elevated temperature (80-90° C.), a phosphate material like LiFePO$_4$ would be expected to corrode in this medium unless protected with carbon at a nanoscale level. Therefore, although the mechanism is not completely known, the carbon coating technology (CCT) of the present invention must have protected the olivine material from corrosion. The CCT technique could be extended to other materials with appropriate physical and chemical performances such as nasicon.

As seen in FIG. 4, the TGA curve of the carbon coated olivine material shows that below 400° C., there is partial oxidation of LiFePO$_4$, represented by the equation:

Between 400-500° C., there is complete oxidation of carbon, represented by the equation:

Between 500-700° C., there is complete oxidation of LiFePO$_4$, represented by the equation:

Finally, we can calculate the amount of carbon coated onto the LiFePO$_4$ according to the following simple equation:

% carbon=|105.03−101.62|≈3.40%

Cycling data of olivine coated material with different electrolytes

Figure 7:
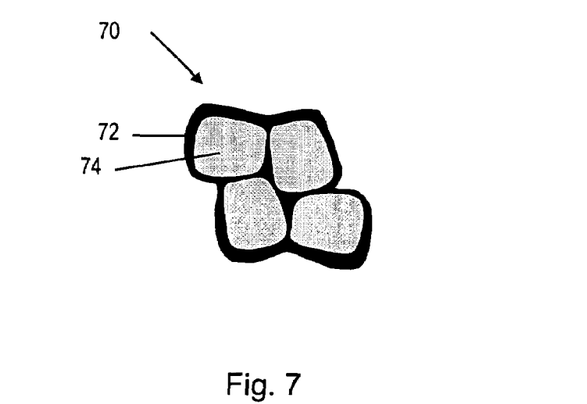
FIG. 7 is a schematic drawing of the carbon coated olivine.

FIG. 7 shows schematically the carbon coated olivine 70 of the present invention. Carbon 72 surrounds olivine particles 74, protecting them from corrosion.

Figure 8A:
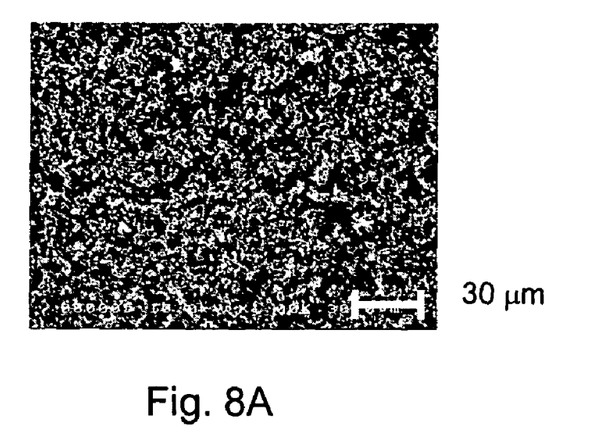
FIGS. 8A-8C are SEM photographs of a piece of $LiFePO_4$/C electrode at various magnifications.
Figure 8B:
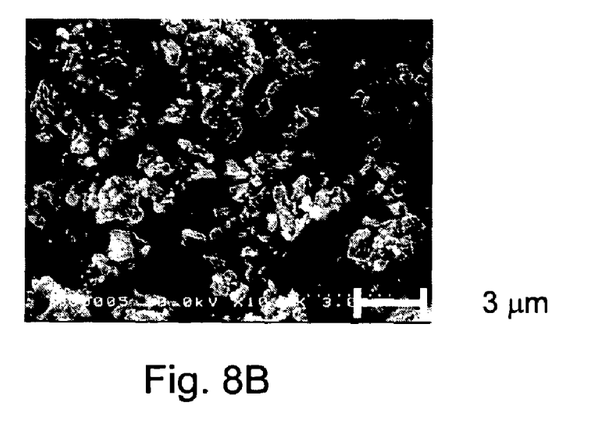
Figure 8C:
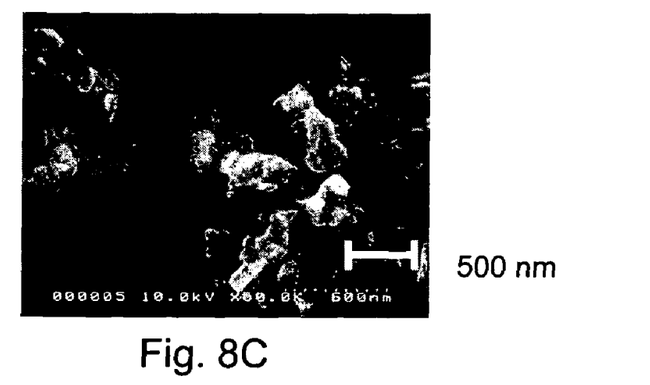

FIGS. 8A, 8B, and 8C show SEM photographs of a piece of positive active material at various magnifications. The positive active material was made of 92%(LiFePO$_4$/C):8%PVdF. Alternatively or additionally, other binders known in the art, such as polytetrafluoroethylene (PTFE) or styrene butadiene rubber (SBR), can be used. The amount of carbon in the LiFePO$_4$/C was 3.4% and has been estimated by TGA measurements. Note that we did not use extra conductive carbon during the preparation of the positive electrode, which means that for the first time we reached a very low carbon ratio that was far less than the 15% commonly used. However, additional conductive carbon (graphite, carbon black, acetyl black, or other carbonaceous material) may optionally be used to further increase conductivity. The electrochemical tests were carried out at room temperature and 37° C. using lithium metal as a counter electrode. The particle sizes of olivine are very small, averaging 200 nm; the carbon layer size is rather smaller.

Figure 9:
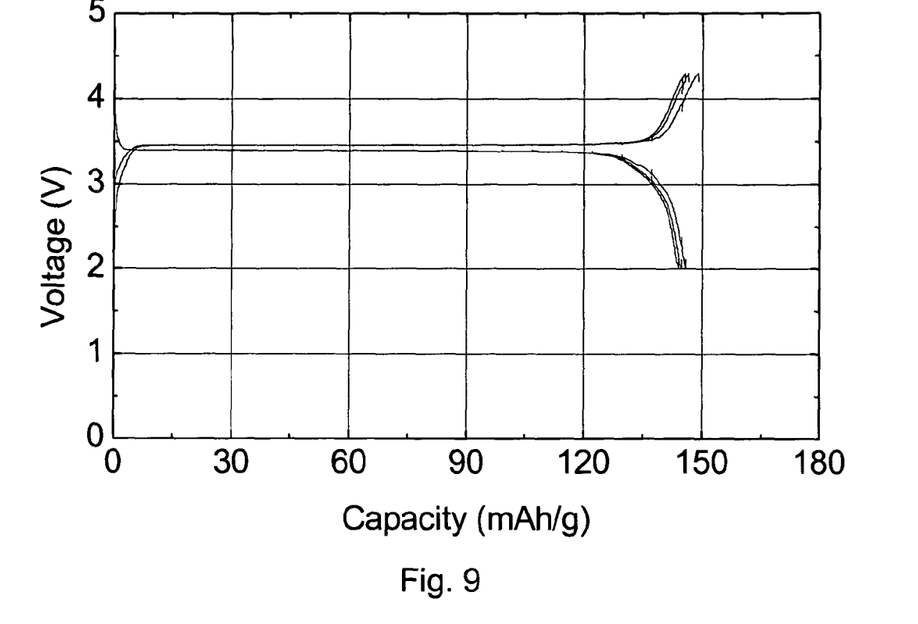
FIG. 9 is a charge/discharge voltage typical profile of a carbon coated olivine positive electrode.
Figure 10:
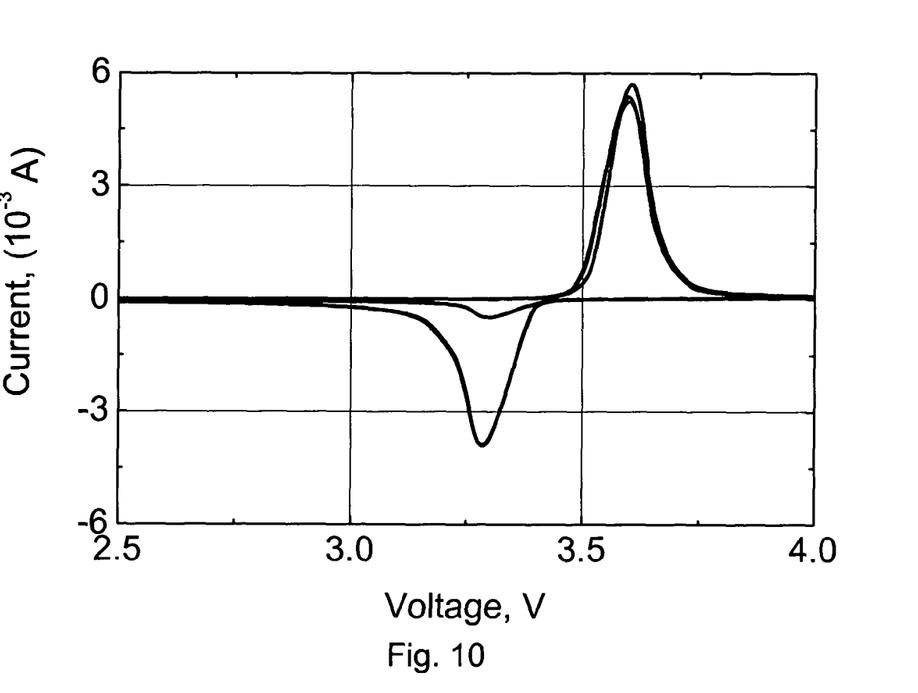
FIG. 10 is a cyclic voltammogram of $LiFePO_4$/C positive electrode showing a two-phase redox reaction.
Figure 11A:
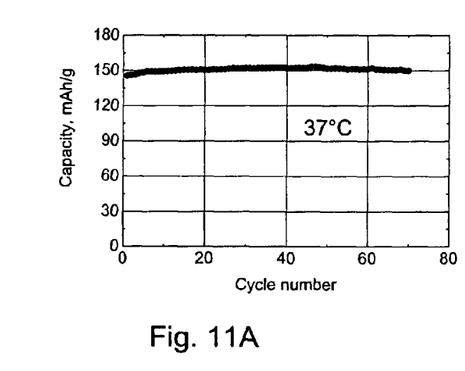
FIGS. 11A-11D are graphs of cycling data of carbon coated olivine material with different electrolytes at different temperatures.
Figure 11B:
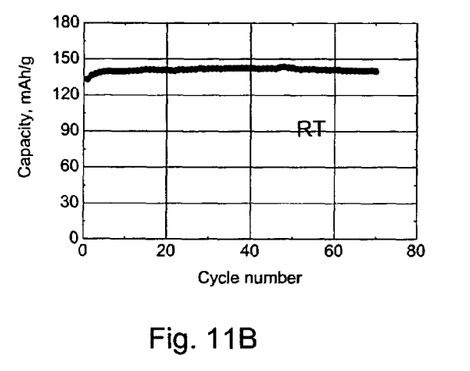
Figure 11C:
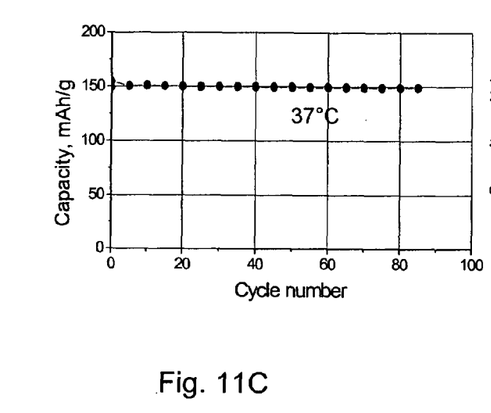
Figure 11D:
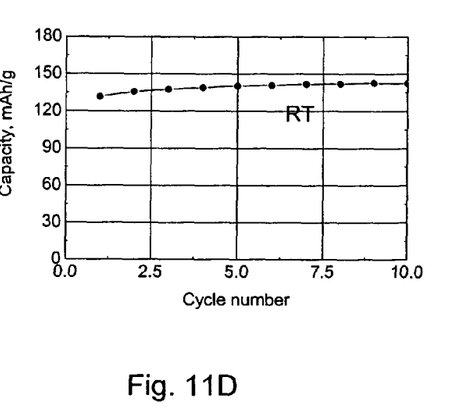

FIG. 9 shows a typical charge-discharge voltage profile, while FIG. 10 shows a typical cyclic voltammogram (CV) of the carbon-coated olivine electrode. The reproducibility of the anodic and cathodic peaks is representative of the reversibility of the electrode. These peaks are characteristic of a two-phase (Fe$_{3+}$/Fe$_{2+}$) redox couple.

FIGS. 11A-11D present some data on the cyclability of the material. The cycling data were obtained using half-cells at room temperature and 37° C. We used different electrolytes such as LiPF$_6$, lithium bis(oxalate)borate (LiBOB), LiFAP, and LiBF$_4$. All cells were cycled at about C/10 rate between 3 V and 3.7 V. The data show that within this range, all of these electrolytes are very stable during the charge/discharge process. No capacity fade is observed for this material regardless of the electrolyte used.

Conductivity of the Material

Figure 12:
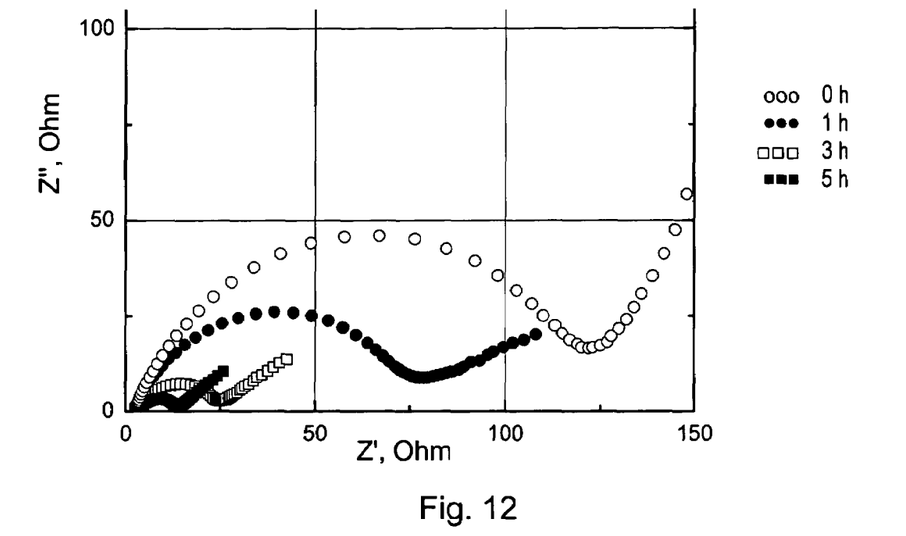
FIG. 12 is a graph of impedance spectra for $Li_xFePO_4$/C at various states of charge.

FIG. 12 shows the impedance spectra for Li$_x$FePO$_4$/C at various states of charge (SOC). Cells were charged at 3.5 V constant voltage for different amounts of time. The electrochemical impedance spectroscopy (EIS) measurements were carried out by the end of each hour to monitor the resistance of the cell at different rates of the lithiation process. We notice that the resistance of the cells dropped continuously from 125 Ω (discharged material) to 10 Ω (100% charged material). These values are very low when compared to the literature for uncoated olivine. Thus, we logically can relate these very low values to the increase in the overall conductivity of the carbon coated olivine.

Figure 13A:
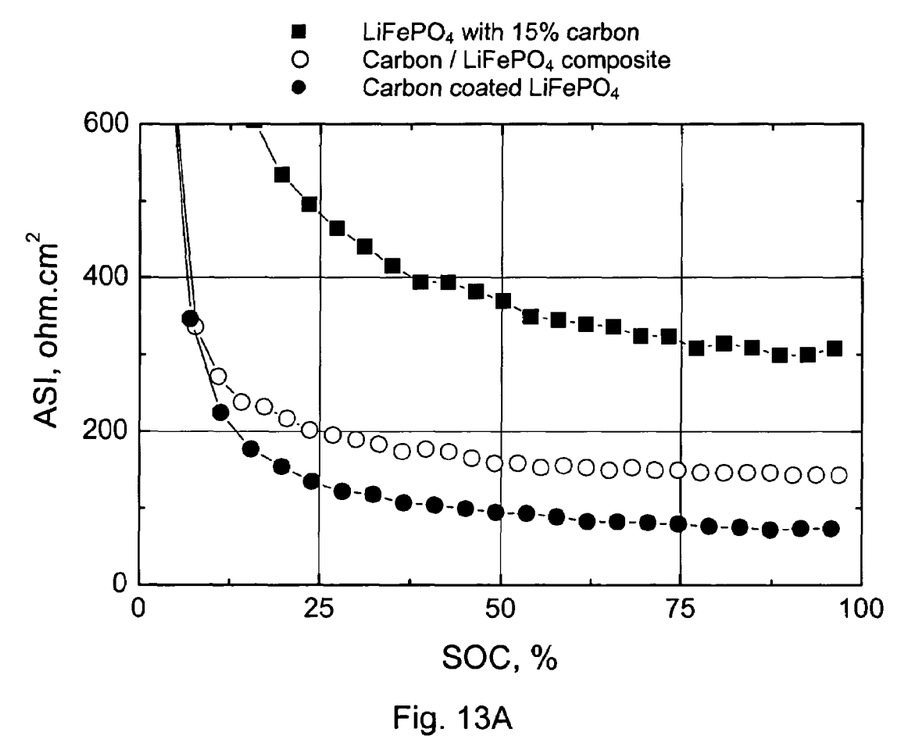
FIGS. 13A-C are graphs of Area Specific Impedance (ASI) curves of different olivine positive active materials and on different substrates.

FIG. 13A shows the Area Specific Impedance (ASI) of different olivine positive electrodes as a function of the state of the charge of the cells. As shown in FIG. 13A, the cell having a positive electrode comprising olivine coated with carbon shows much lower impedance than either the carbon olivine composite, which contained 10% carbon, or olivine mixed with 15% carbon black. These electrodes were all made using an aluminum current collector.

Figure 13B:
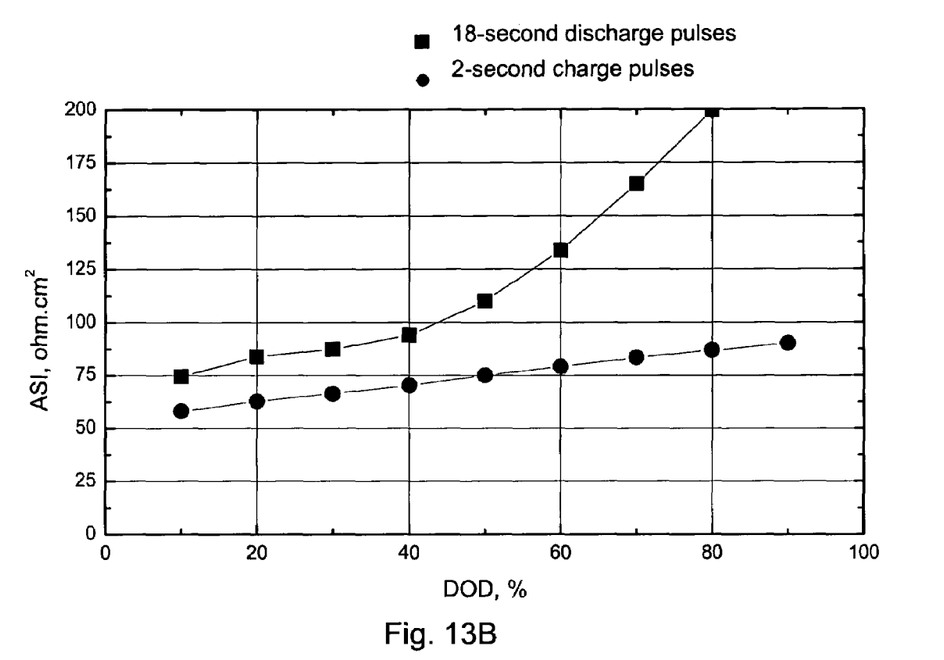
Figure 13C:
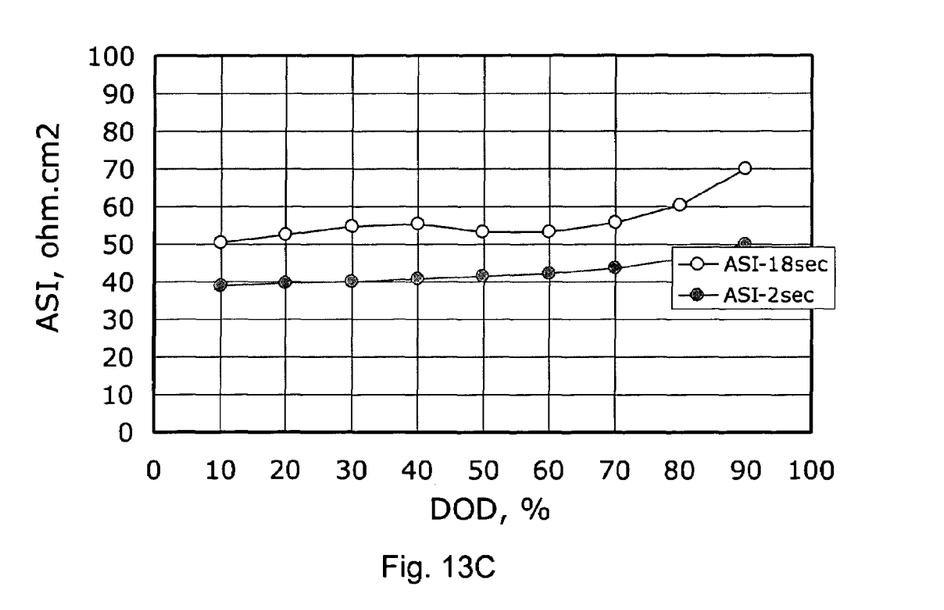
Figure 14A:
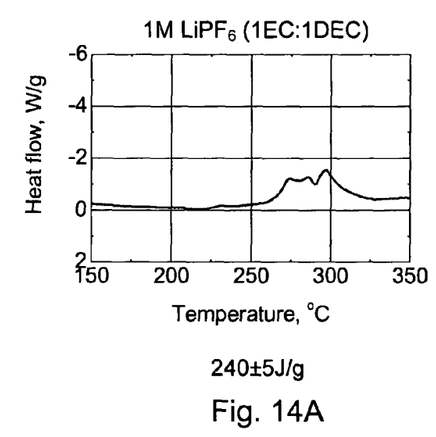
FIGS. 14A-14D are graphs of Differential Scanning Calorimetry (DSC) measurements of 100% charged carbon-coated olivine positive electrode with different electrolytes.
Figure 14B:
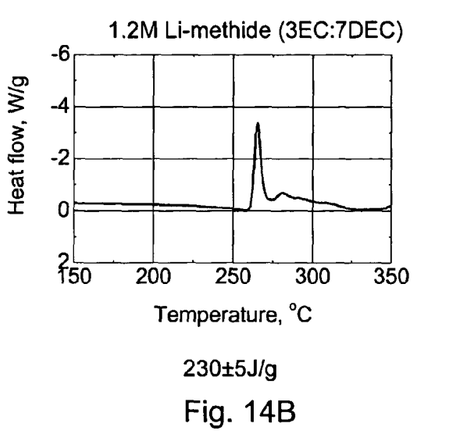
Figure 14C:
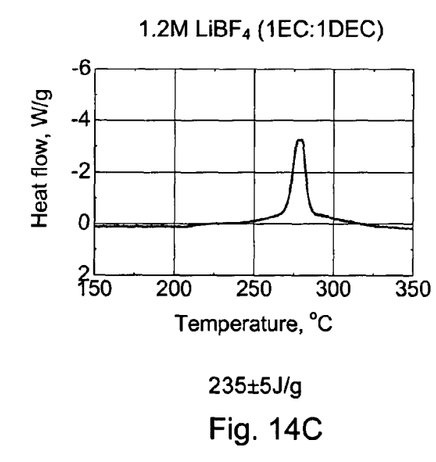
Figure 14D:
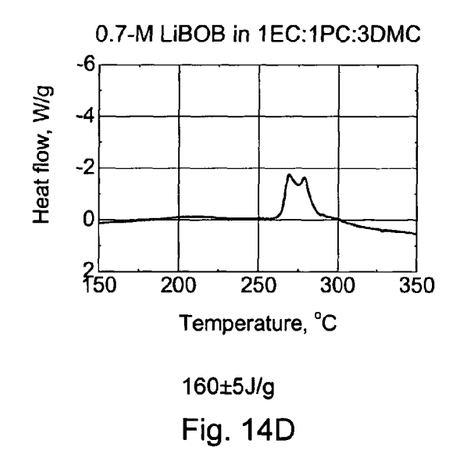

FIGS. 13B and 13C show the impact on cell impedance of using an aluminum current collector coated with a carbon coating having a thickness of about 3 microns. LiFePO$_4$ with 8% acetylene black was coated onto a carbon coated aluminum current collector and the ASI was measured at various depths of discharge. As seen in FIG. 13B, the ASI was greatly reduced compared to the approximately 300 ohm·cm$^2$ seen in FIG. 13A for the LiFePO$_4$ with 15% carbon, even though the amount of the conductive carbon was less. In another test, 3%carbon coated LiFePO$_4$ made as taught herein was coated onto a carbon coated aluminum current collector. As seen in FIG. 13C, the ASI was again reduced significantly as compared to the approximately 100 ohm·cm$^2$ seen in FIG. 13A for the Carbon coated LiFePO$_4$. In both sets of tests, the cells were discharged at a rate of 5C using 18-second discharge and then also tested by charging at 5C using 2-second charge pulses, which is the protocol generally used to simulate the function of the battery in a hybrid electric vehicle. From these tests, it can be seen that providing a carbon coated aluminum current collector greatly improves conductivity for olivine, whether carbon coated such as using the method described herein or uncoated but mixed with conductive carbon. The inventors expect a similar benefit when using the carbon/LiFePO$_4$ composite on a carbon coated substrate, or when using nasicon (carbon coated, carbon composite, or uncoated with conductive additive such as a form of carbon). The performance of electrodes having low electronic conductivity active materials, such as CF$_x$, will be greatly improved by this technique of carbon coating the substrate. Furthermore, for very high rate applications, this technique will enhance performance of electrodes in which already conductive active materials such as silver vanadium oxide (SVO) or MnO$_2$ are used. The thickness of the carbon coating is preferably less than 15 microns, more preferably less than 10 microns, even more preferably about 3 microns or less, and most preferably less than 2 microns. The carbon coating may be applied using any suitable process known in the art, such as chemical vapor deposition (CVD) or by coating a paste made of carbon and a binder.

Safety Evaluation

FIGS. 14A-14D present Differential Scanning Calorimetry (DSC) measurements for carbon coated olivine electrode charged at 100% SOC with different electrolytes. The reactivity of this electrode with all electrolytes occurs around 260° C. In general, the reactivity of this material, seen here as exothermic peaks, is very low when compared to that of LiMO$_2$ (M=Ni, Co, or Mn) systems (not shown). In the latter, the structure of these layered materials is unstable at high states of charge; also the generation of highly oxidizing ions, for instance Ni$^{4+}$, makes them very reactive with the electrolytes. Because of the structural stability of Fe$^{III}$PO$_4$/C generated after the charge and also because the carbon coating plays a barrier role against reaction between the electrolyte and the electrode at the interface, the LiFePO$_4$/C is far less reactive with the electrolytes. Our DSC measurements for the carbon coated olivine show that the heat generated with lithium bis(oxalato) borate (LiBOB) electrolyte (160 J/g) is lower than that generated with the other electrolytes tested (230-240 J/g), making the LiBOB electrolyte with our carbon coated olivine a preferred choice. The solvent used in the LiBOB testing was EC:DEC.

Figure 15:
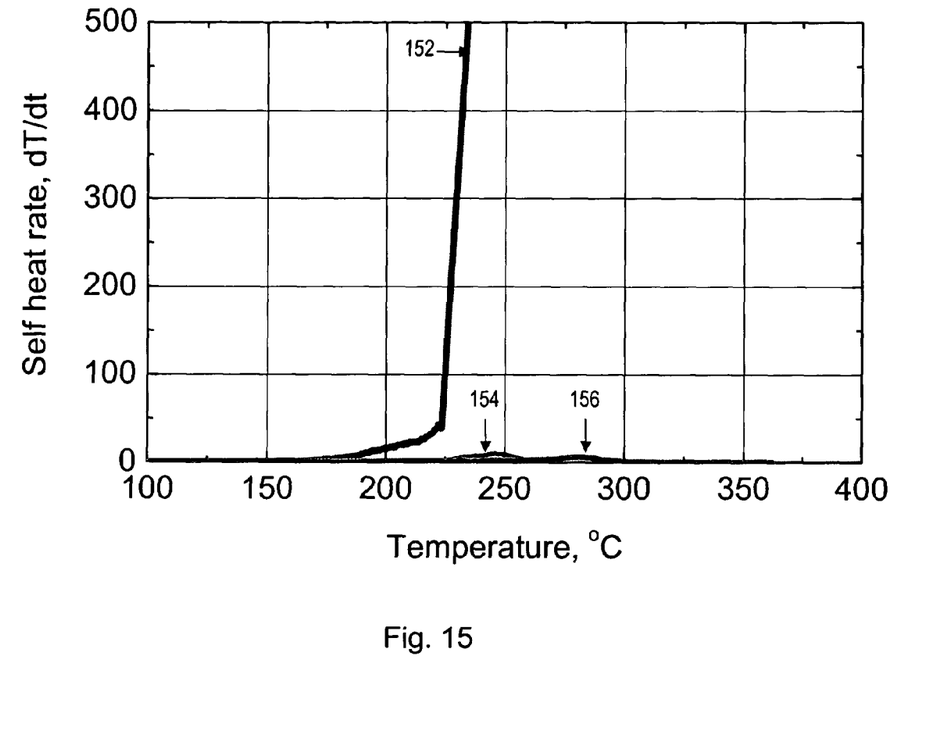
FIG. 15 shows an Accelerated Rate Calorimetry (ARC) study of 100-mAh prismatic cells using the carbon coated olivine of the present invention with two different electrolytes.

FIG. 15 shows an Accelerated Rate Calorimetry (ARC) study of 100-mAh prismatic cells using the carbon coated olivine of the present invention with two different electrolytes. Curve 152 shows that a different positive electrode control material, LiNiCoAlO$_2$, was tested and found to have thermal runaway at between 200 and 250° C. Curves 154 and 156 show that the test cells of carbon coated olivine with a LiPF$_6$ based electrolyte and with a LiBOB based electrolyte, respectively, had no thermal runaway, even up to 350° C.

Figure 16A:
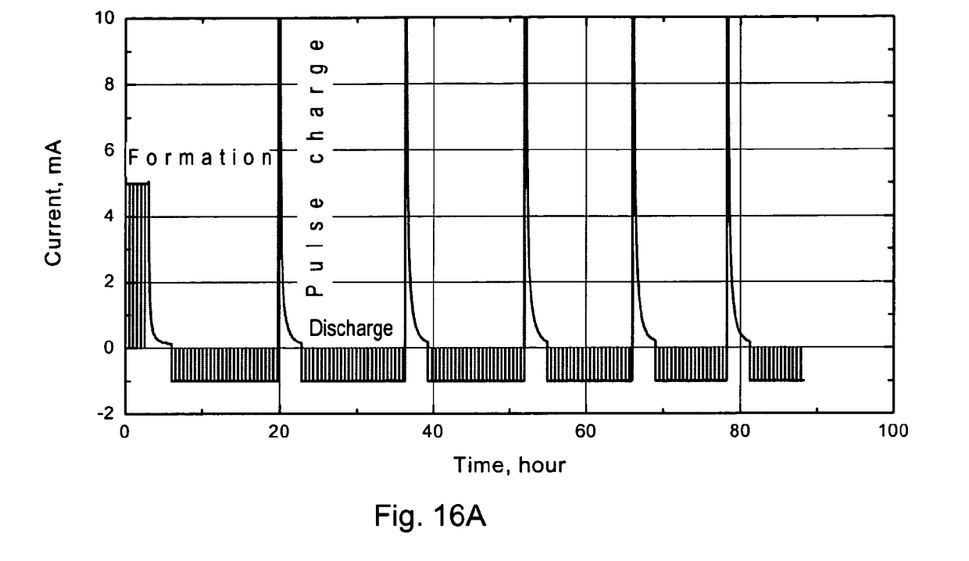
FIGS. 16A and 16B show the results of a pulsed charge characterization test of carbon coated olivine of the present invention.
Figure 16B:
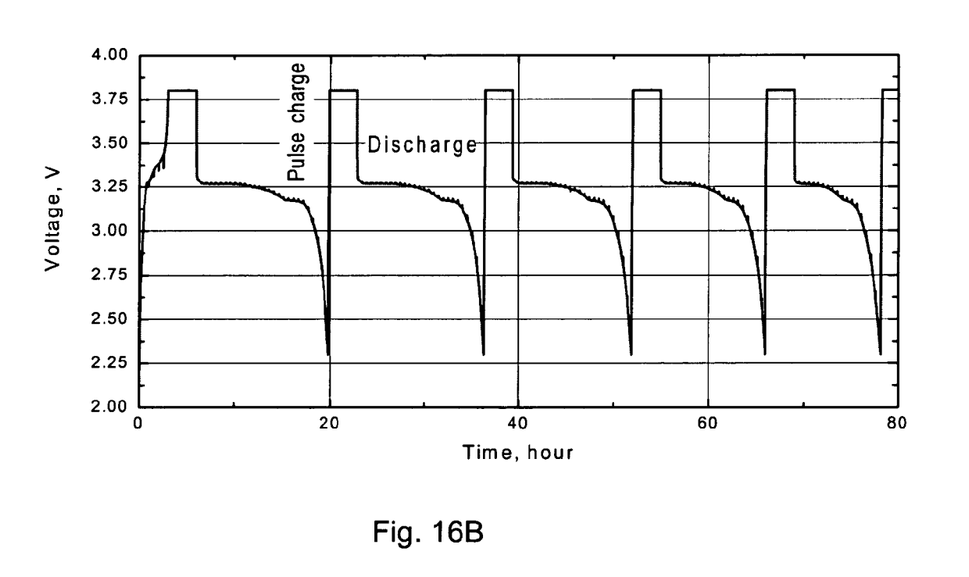

FIGS. 16A and 16B show the results of a pulsed charge characterization test of carbon coated olivine of the present invention. The test procedure began with a formation cycle, which included charging at 5 mA, then discharging at 1 mA. This was followed by several cycles of charging and discharging. Charging was carried out at 20 mA up to 3.8 V, then at 3.8 V constant voltage. Discharging was carried out at 1 mA, which is about C/13, down to 2.3 V. The data show that the material can be effectively charged within about 1 minute.

The specific implementations disclosed above are by way of example and for enabling persons skilled in the art to implement the invention only. We have made every effort to describe all the embodiments we have foreseen. There may be embodiments that are unforeseeable or which are insubstantially different. We have further made every effort to describe the invention, including the best mode of practicing it. Any omission of any variation of the invention disclosed is not intended to dedicate such variation to the public, and all unforeseen or insubstantial variations are intended to be covered by the claims appended hereto. Accordingly, the invention is not to be limited except by the appended claims and legal equivalents.

We claim:

1. A method for making a battery, comprising:
    exposing divine or nasicon to a heated carbon source gas such that a coating is deposited on the olivine or nasicon, the coating consisting of carbon from the source gas; and
    activating a positive electrode and a negative electrode with an electrolyte, the positive electrode including the carbon deposited on the olivine or nasicon.

2. The method of claim 1, wherein the olivine or nasicon includes nasicon represented by A$_n$B$_2$(XO$_4$)$_3$, wherein
    A is chosen from the group consisting of: Li, Ag, Cu, Na, Mn, Fe, Co, Ni, Cu, and Zn;
    B is chosen from the group consisting of: Ti, V, Cr, Fe, and Zr;
    X is chosen from the group consisting of: P, S, Si, W, Mo; and
    n is between 0 and 3.

3. The method of claim 1, wherein the olivine nasicon includes olivine represented by LiFe$_{1-x}$M$_x$PO$_4$, wherein
    M is chosen from the group consisting of Mn, Co, Ti, and Ni; and
    $0 \leq x \leq 1$.

4. The method of claim 1, wherein the carbon source gas decomposes at a temperature between 100° C. and 1300° C. during deposition of the carbon on the olivine or nasicon.

5. The method of claim 1, wherein the carbon source gas decomposes at a temperature between 400° C. and 700° C. during deposition of the carbon on the olivine or nasicon.

6. The method of claim 1, wherein the carbon source gas is chosen from the group consisting of: acetylene, butane, 1-3 butadiene, 1-butane, Cis-2-butene, Trans-2-butene, 2-2 dimethylpropane, ethane, ethylene, isobutane, isobutylene, methane, propane, toluene, propylene, and mixtures thereof.

7. The method of claim 1, wherein the olivine or nasicon is exposed to the carbon source gas in a furnace chosen from the group consisting of: a fluidized bed furnace, a rotatory furnace, and a static furnace.

8. The method of claim 1, wherein the carbon source gas is mixed with an inert gas.

9. The method of claim 8, wherein the inert gas is chosen from the group consisting of: nitrogen, helium, argon, and mixtures thereof 10. The method of claim 1, wherein the olivine or nasicon contains pores and the carbon is deposited in the pores.

11. The method of claim 1, wherein the deposited carbon is <15 wt % of the deposited carbon plus the olivine or nasicon.

12. The method of claim 1, wherein the deposited carbon is <4 wt % of the deposited carbon plus the olivine or nasicon.

13. The method of claim 1, wherein the positive electrode includes
    a coating on a current collector, the coating including the carbon deposited on the olivine or nasicon.

14. The method of claim 13, wherein the coating further comprises a conductive additive.

15. The method of claim 13, wherein the current collector includes a carbon coating on aluminum.

16. The method of claim 15, wherein the thickness of the carbon coating on the aluminum is less than 80 microns.

17. The method of claim 16, wherein the thickness of the carbon coating on the aluminum is less than 30 microns.

18. The method of claim 17, wherein the thickness of the carbon coating on the aluminum is less than 15 microns.

19. The method of claim 18, wherein the thickness of the carbon coating on the aluminum is less than 10 microns.

20. The method of claim 19, wherein the thickness of the carbon coating on the aluminum is about 3 microns or less.

21. The method of claim 20, wherein the thickness of the carbon coating on the aluminum is less than 2 microns.

22. The method of claim 1, wherein the electrolyte is a nonaqueous electrolyte.

23. The method of claim 1, wherein the electrolyte includes a salt dissolved in a solvent that includes at least one linear or cyclic carbonate.

24. The method of claim 23, wherein the salt is chosen from the group consisting of: LiClO$_4$, LiPF$_6$, LiBF$_4$, LiAsF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, Li-methide, Li-imide, lithium alkyl fuorophosphate, lithium bis(chelato)borate, and a mixture thereof.

25. The method of claim 1, wherein the negative electrode includes one or more materials chosen from the group consisting of: lithium metal, graphite, other carbon, Cu$_6$Sn$_5$, Cu$_2$Sb, MnSb, Li$_4$Ti$_5$O$_{12}$, and silica alloys.

26. The method of claim 1, wherein exposing the olivine or nasicon to the heated carbon source gas includes
    exposing the olivine or nasicon to the carbon source gas and then heating the carbon source gas to generate the carbon and deposit the carbon on the olivine or nasicon.

\* \* \* \* \*